June 22, 1943. E. K. KUHLES 2,322,639
WEIGHT OPERATED DIRECTIONAL VALVE AND CONTROL MECHANISM THEREFOR
Filed April 11, 1941 3 Sheets-Sheet 1
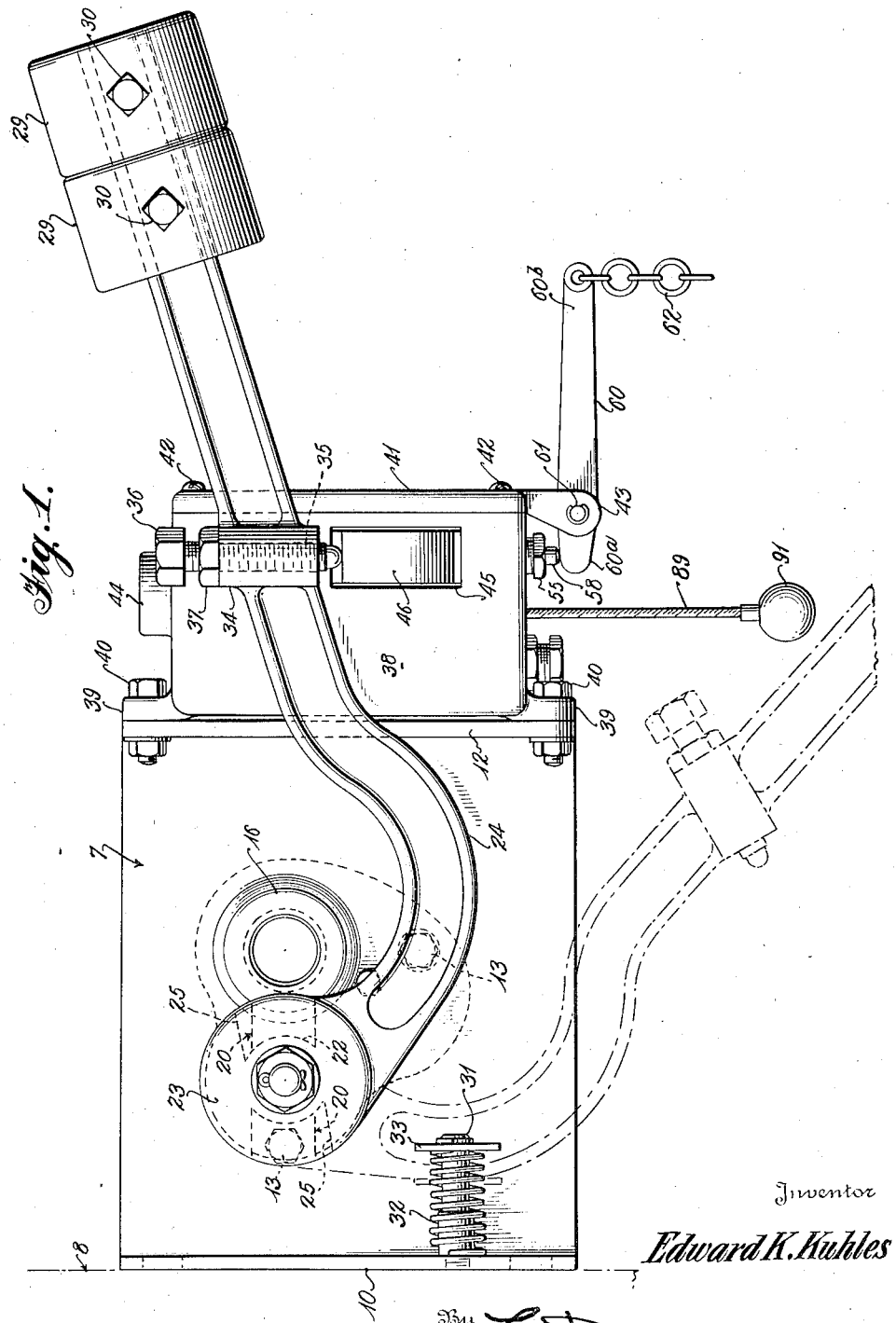
Inventor
Edward K. Kuhles

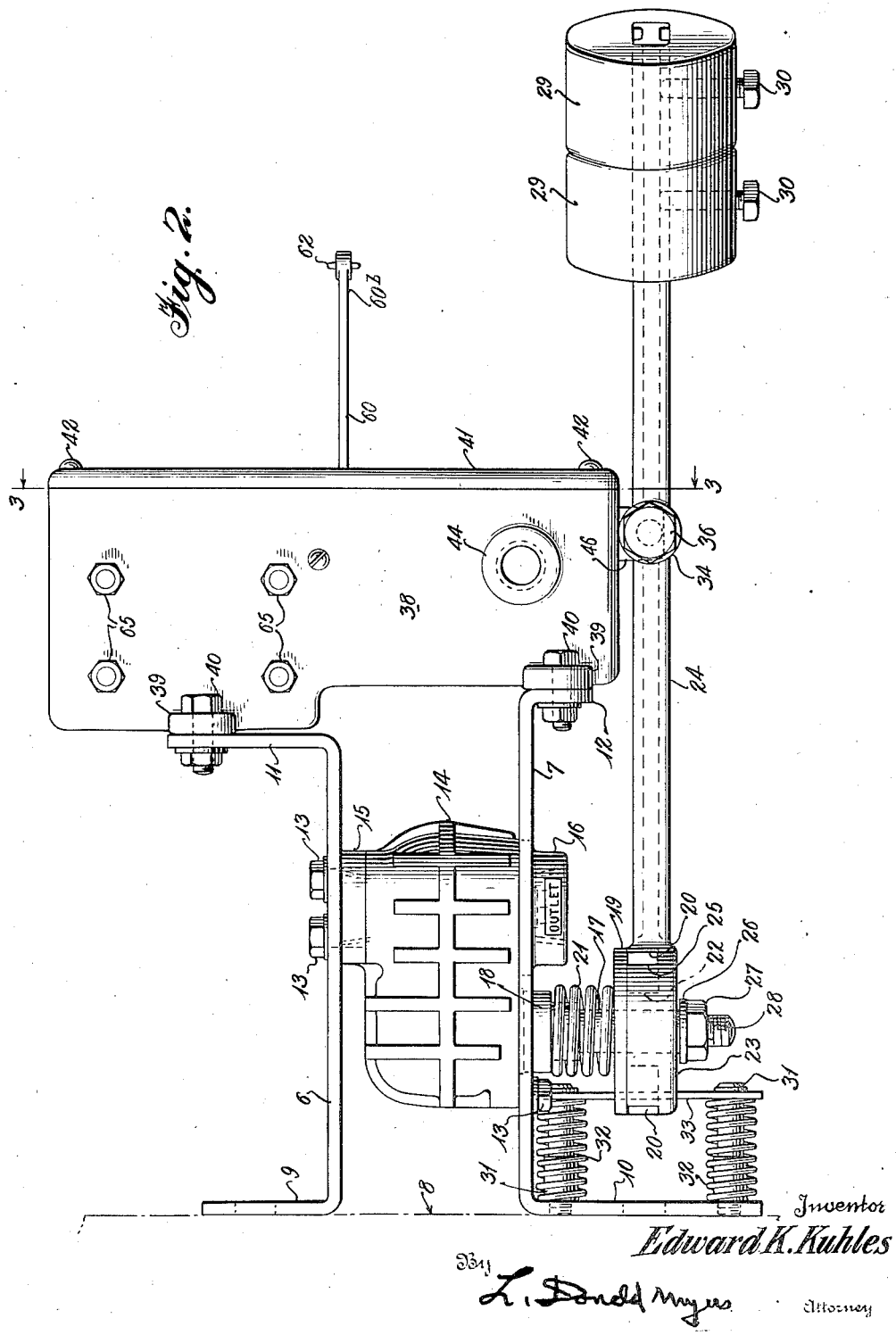

June 22, 1943.  E. K. KUHLES  2,322,639
WEIGHT OPERATED DIRECTIONAL VALVE AND CONTROL MECHANISM THEREFOR
Filed April 11, 1941    3 Sheets-Sheet 3
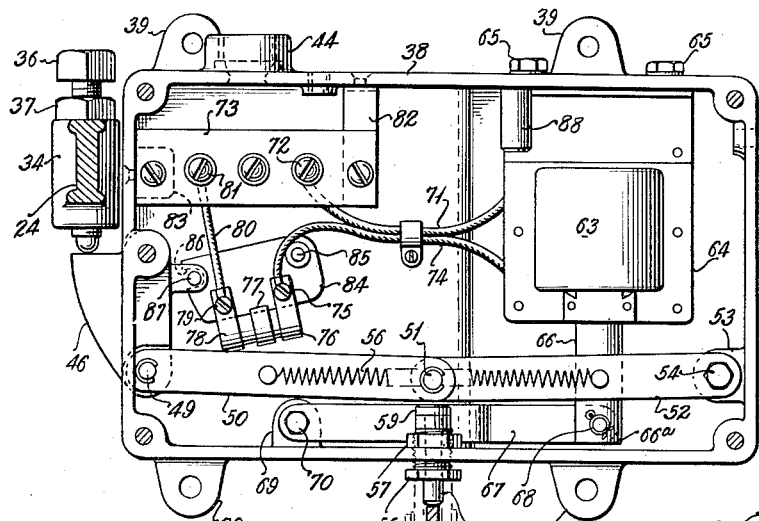
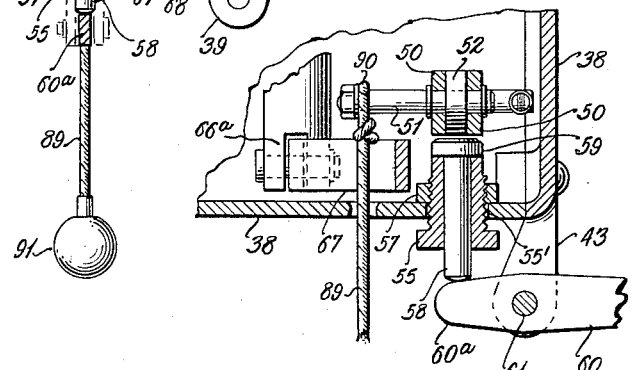
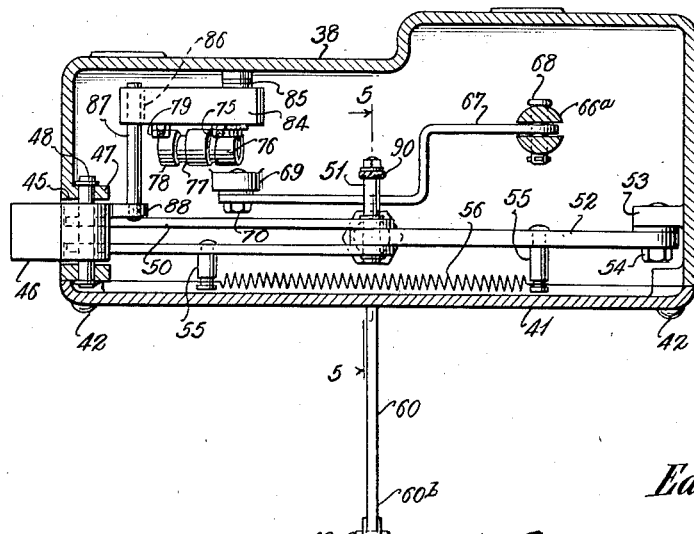
Inventor
*Edward K. Kuhles*
By L. Donald Meyers
Attorney Patented June 22, 1943

2,322,639

UNITED STATES PATENT OFFICE 2,322,639

WEIGHT OPERATED DIRECTIONAL VALVE AND CONTROL MECHANISM THEREFOR

Edward K. Kuhles, Wilmette, Ill., assignor, by mesne assignments, to Reconstruction Finance Corporation, Chicago, Ill., a corporation of the United States Application April 11, 1941, Serial No. 388,182

15 Claims. (Cl. 137—139)

This invention relates to new and useful improvements in weight operated directional valves and combined manual and automatic control mechanism for governing their operation when used in carbon dioxide fire extinguishing systems.

A comparatively recent innovation in fire extinguishing systems involves the use of liquid carbon dioxide, stored in a large capacity tank at a constant temperature, and its corresponding vapor pressure, as the means of extinguishment. The carbon dioxide is confined in the tank until a fire occurs and is then either manually or automatically released and directed to the scene of the fire through the proper pipe lines of the system. Due to the manner of storing the extinguishing medium, any desired predetermined quantity may be delivered to the point or points of application at any rate deemed most suitable for the particular hazard or hazards involved by merely employing pipe lines and discharge nozzles of proper sizes. Systems having pipe diameters as large as six inches and using rates of discharge up to six tons per minute have been installed so far and are proving to be entirely satisfactory.

When this type of system is employed for protecting only one hazard, it is necessary to use only one control valve which is located closely adjacent the supply tank and is operated to release the carbon dioxide into the pipe line leading to the hazard. When the liquid reaches the discharge end of the pipe line it is released to the atmosphere through one or more suitable discharge nozzles. This type of control valve must be capable of confining the carbon dioxide for indefinite periods without permitting any leakage. Sufficiently powerful valve operating means must be employed to open the valve while it is subjected to the vapor pressure of the confined carbon dioxide.

When such a system protects two or more hazards which are to be treated separately; i. e., fire is to be extinguished at only one hazard at any given time, directional valves must be employed in addition to the aforesaid master tank control valve to limit the discharge to the particular hazard involved. These directional valves, one being provided for each hazard, are not subjected to the vapor pressure of the carbon dioxide for any prolonged period of time and, by opening the proper directional valve in advance of actuation of the master tank control valve, the operating means for the directional valves need only be sufficiently powerful to free the movable valve body from its seat in case it is stuck.

It is the primary object of this invention to provide a weight operated directional valve and combined manual and automatic control mechanism for carbon dioxide fire extinguishing systems.

A further important object of the invention is to provide control mechanism for weight operated directional valves which will cause the valves to be opened as a result of closing of an electric circuit by a suitable fire detecting device, or which will permit the valve to be opened as a result of manual manipulation of the control mechanism.

Still another object of the invention is to provide means for effecting manual resetting of the control mechanism after either manual or automatic operation of the same to enable the system to be reconditioned for extinguishing another fire.

Other objects and advantages of the invention will be apparent during the course of the following description.

In the accompanying drawings forming a part of this specification and in which like numerals are employed to designate like parts throughout the same, Figure 1 is a side elevational view of a weight operated directional valve and its control mechanism adapted for use in carbon dioxide fire extinguishing systems, Figure 2 is a top plan view of the valve and mechanism shown in Fig. 1, Figure 3 is a vertical sectional view taken on line 3—3 of Fig. 2 and illustrates in detail the various instrumentalities which comprise the aforesaid control mechanism, Figure 4 is a horizontal sectional view taken through the control mechanism casing of Fig. 3 and illustrates the control instrumentalities from another angle, and Figure 5 is an enlarged fragmentary sectional view taken on line 5—5 of Fig. 4.

In the drawings, wherein for the purpose of illustration is shown the preferred embodiment of this invention, and first particularly referring to Figs. 1 and 2, mounting means for the directional valve and its control mechanism is made up of two parallel plates 6 and 7 which are adapted to be secured to any suitable supporting surface 8 by means of the inner end flanges 9 and 10 respectively. These parallel mounting plates also have outer end flanges 11 and 12 which will be described at a later point as having the control mechanism suitably attached thereto.

Positioned between the mounting plates 6 and 7 and attached thereto by means of the bolts 13 is a gate valve unit 14. The casing of this valve unit is provided with an inlet pipe connection 15 and an outlet pipe connection 16. The mounting plates 6 and 7 are provided with suitable openings for either accommodating these connections or the pipe sections which are to be attached thereto.

The movable body or gate of the valve unit 14 is provided with a suitable operating stem 17 which extends through a packing box, or the like, 18 arranged in a second aperture formed in the mounting plate 7. Figs. 1 and 2 disclose the inner member 19 of a lost motion coupling as being suitably attached to the operating stem 17 of the valve body. This coupling member 19 turns with the operating stem 17 and further includes diametrically extending arms 20. A compression spring 21 is interposed between the packing box 18 and the coupling member 19 while having the valve operating stem 17 threaded therethrough.

The valve stem 17 has journaled thereon the hub 22 of a complementary coupling member 23 which is carried by or forms a part of the valve stem operating lever 24. This complementary coupling member 23 has diametrically arranged recesses 25 formed therein to loosely accommodate the arms 20 carried by the coupling member 19. In other words, the recesses 25 are of greater width than the arms 20 and this difference in width permits a limited amount of lost motion between the two coupling members 19 and 23 and, of course, a corresponding lost motion between the lever 24 and the valve stem 17. The utility of this lost motion will be explained at a later point. The coupling member 20 is retained on the valve stem 17 by means of the washer 26, the nut 27 and the cotter pin 28.

The outer or free end of the valve stem operating lever 24 has mounted thereon the two weights 29 which are held in place by the set screws 30. These weights are relied upon to unseat the movable valve body or gate when the lever 24 is released from its full line position of Fig. 1, which is the position it occupies when the gate or valve body is in its closed position, and is permitted to drop into its lower position which is illustrated in dot and dash lines in Fig. 1. When in this lower position, the valve body or gate has been moved to its open position. It will be noted by inspecting Figs. 1 and 2 that when the operating lever 24 is in its full line position the surfaces of the arms 20 and recesses 25 are in engagement with each other. These engaged surfaces prevent the valve body or gate from moving off of its seat as long as the operating lever 24 is retained in its full line position. When the lever is released from this full line position, the coupling member 23 rigid with the lever is permitted to move a limited distance before the remaining side surfaces of the arms 20 and recesses 25 engage each other to bring about movement of the valve operating stem 17 with the lever 24. This relative movement causes the weighted lever 24 to deliver a blow to the valve stem 17 and the shock of this blow is intended to free the movable valve body or gate from its seat if it happens to be stuck.

Figs. 1 and 2 disclose a resilient stop mechanism which functions to absorb the shock delivered by the weighted lever 24 when it reaches its valve opening position. This resilient stop mechanism includes two parallel pins 31 which are suitably attached at their inner ends to the flange 10 of the mounting plate 7. Each one of these pins 31 has threaded thereon a compression spring 32 which backs up the plate or pad 33 that is slidably mounted on the pins 31. When the weighted valve operating lever 24 drops into its lower position, a portion of the lever engages the strap or pad 33 and moves the same inwardly along the pins 31 against the force of the springs 32.

Figs. 1 and 2 disclose an intermediate portion of the valve operating lever 24 as having an enlargement 34 formed therein. This enlargement is provided with an internally threaded opening 35 for receiving the adjustable screw 36. A jam nut 37 is threaded on the screw 36 to prevent unintentional adjustment of the latter. It will be explained at a later point that this adjustable screw 36 operates to engage a valve lever retaining latch which forms a part of the control mechanism. The adjustment of the screw 36 is provided to compensate for manufacturing tolerances which might prevent the movable valve body or gate from being fully seated when the lever was held in its uppermost position. In other words, if no adjustment were provided between the engaging portions of the valve stem operating lever 24 and its retaining latch, the latch might fail to position the lever properly to bring about full seating of the movable valve body or gate.

The control mechanism for the valve is housed in a casing 38 which is shown in Figs. 1 and 2 as being secured to the flanges 11 and 12 of the mounting plates 6 and 7 by means of the four apertured ears 39 and the securing devices 40, which may take the form of nuts and bolts. This casing 38 is closed at its front by means of a cover 41 which is detachably secured in place by the screws 42. Fig. 1 discloses a pair of apertured ears 43 as depending from the cover 41. These ears will be described at a later point as functioning to support a manual release lever. The top wall of the casing 38 is provided with a nipple 44 employed for connecting a conduit to the casing through which suitable electric circuit wires are passed.

Figs. 1, 3 and 4 disclose one end wall of the casing 38 as having an opening 45 formed therein for movably receiving the latch 46. This latch is pivotally connected to the apertured ears 47 by means of the pivot pin 48. The lower portion of the latch 46 has pivotally connected thereto, by means of the pin 49, the double arms 50 which form one-half of a toggle lever that further includes the pivot pin 51 and the arm 52 that is pivoted at its outer end to the apertured ear 53 by means of the pin 54. Posts 55 are carried by one of the arms 50 and the arm 52 and the tension spring 56 is connected to the outer ends of these posts.

Figs. 3, 4 and 5 disclose this toggle lever in its normal or set position. Fig. 3 discloses this normal or set position to be one in which the joint of the toggle is broken slightly past dead center in one direction. That is to say, the axis of the center joint pin 51 is arranged slightly to one side of the plane which passes through the axes of the two pivot pins 49 and 54. The tension spring 56, naturally, exerts its force in a direction to maintain this toggle lever joint on either side of a dead center position and it is only necessary to break the joint in either direction to have this spring perform its intended function.

The mechanism employed for determining the normal or set position of the toggle lever consists of a sleeve 55 which is threaded in an opening 55' formed in the bottom wall of the casing. A jam nut 57 is threaded on the portion of the sleeve that projects inside of the casing. A trip button 58 is slidably positioned in the bore of the sleeve 55 and has an enlarged head or pad 59 formed on its upper end. This enlarged head or button 59 is engaged by the toggle joint. By adjusting the sleeve 55 relative to the bottom casing wall, the normal or set position of the toggle lever may be varied.

It will be appreciated by inspecting Figure 3 that the normal or set position of the toggle lever functions to arrange the latch 46 so that it projects outwardly of the casing 38 through the end wall opening 45. When in this position, the latch engages the lower end of the adjustable screw 36, carried by the valve stem operating lever 24, for retaining the lever in its valve seating position. By breaking the toggle lever joint in the opposite direction from its normal position, the tension spring 56 will pull on the lever arms and will swing the latch 46 inwardly to release the weighted valve operating lever 24. Of course, the weight of the lever 24 initially assists the spring 56 in retracting the latch 46.

The toggle lever joint may be manually broken in an upward direction, to bring about release of the valve operating lever 24 and opening of the valve, by means of the manual release lever 60 which is pivotally connected to the ears 43, carried by the casing cover 41, by means of the pivot pin 61. The inner end 60a of this release lever 60 underlies the trip button 58. Figs. 1, 2 and 4 disclose the outer end 60b of this manual release lever 60 as having a section of pull chain, or the like, 62 attached thereto. By pulling downwardly on this chain 62, the lever 60 is pivoted and its inner end 60a will displace the trip button 58 upwardly to a sufficient extent to move the joint of the toggle lever vertically past dead center. This release lever 60, therefore, may be employed for manually opening the directional valve 14.

In addition to being manually controllable, by a person positioned at the directional valve, it is highly desirable to be able to either manually or automatically control the operation of the directional valve from a remote point. This remote control of the directional valve is accomplished by closing the circuit to the coil 63 of the solenoid 64 which is attached to the top wall of the casing 38 by means of the four screws 65.

The armature 66 of the solenoid is bifurcated at its lower end 66a for pivotal connection with the angularly shaped lever 67 by means of the pivot pin 68. The remaining end of this angular lever 67 is pivotally connected to the apertured ear 69, carried by the bottom wall of the casing 38, by means of the pivot pin 70. It will be noted by inspecting Figs. 4 and 5 that the intermediate portion of this angular lever 67 underlies the rearwardly extending portion of the toggle joint pin 51 and is normally spaced from this joint pin. When the solenoid coil 63 is energized, the solenoid armature 66 suddenly moves upwardly and delivers a sharp blow to the toggle joint pin 51. This blow, of course, is delivered to the pin 51 by means of the angular lever 67. The combined action of the upward movement of the solenoid armature 66, the swinging movement of the lever 67 and the blow applied to the toggle lever joint pin 51 by the lever 67 result in moving the toggle lever joint past dead center in an upward direction. The energizing of the solenoid coil 63, therefore, has the effect of tripping the toggle and retracting the latch 46 so that the valve stem operating lever 24 will open the directional valve.

The circuit for the solenoid coil 63 includes the wire 71 which extends to the binding post 72 carried by the strip of insulating material 73. The second wire 74 for the solenoid coil extends to the binding post 75 of the clip 76 for the mercury switch element 77. The second clip 78 for this mercury switch element has its binding post 79 connected to the wire 80 that extends to the binding post 81 carried by the strip of insulation 73. This insulation strip 73 is mounted in the front portion of the casing 36 by means of the end straps 82 and 83.

The clips 76 and 78 for the mercury switch element 77 are attached to the mounting member 84 which is pivotally supported by the pin 85 that projects forwardly from the wall of the casing 38. Figs. 3 and 4 disclose the free end portion of the switch mount 84 as having a notch 86 formed therein for receiving the actuating pin 87 which is carried by the ear 88 attached to the latch 46.

When the mercury switch element 77 is arranged in the position illustrated in Fig. 3, the circuit to the solenoid coil 63 is closed at this point. To energize the solenoid coil, it is only necessary to close the circuit at some remote point of control. This remote control may either consist of a manually operable push button type of switch or circuit closing means which operates in response to energization of a suitable fire detecting device.

When the solenoid coil 63 is energized and results in tripping the toggle lever upwardly to retract the latch 46, the pivoting of the latch swings the mount 84 for the mercury switch element 77 upwardly about its pivot 85 and the circuit to the solenoid coil 63 is broken as a result of the mercury switch element 77 assuming this new position. It will be apparent, therefore, that the circuit to the solenoid coil 63 is automatically broken at a point within the casing 38 as soon as the valve operating lever 24 is released to bring about opening of the directional valve.

For the purpose of limiting the upward swinging movement of the toggle joint, a stop pin 88 is attached to the top wall of the casing 38 and depends into the path of the toggle lever joint.

To reset the entire control mechanism, a cable 89 extends through a suitable aperture in the bottom wall of the casing 38 and is connected on its upper end 90 to the joint pin 51 of the toggle. The lower, exterior end of the cable 89 has mounted thereon an operating knob or handle 91. When the joint of the toggle lever moves upwardly into engagement with the stop pin 88, the resetting cable 89 is pulled into the casing 38. The operating knob or handle 91, however, will remain exteriorly of the casing when the toggle joint has engaged the stop pin. By merely grasping this operating knob or handle 91 and pulling downwardly on the cable 89, the toggle lever is reset, or is returned to its normal position. This resetting of the toggle lever moves the latch 46 outwardly of the casing 38. Of course, the valve control lever 24 should be manually moved into its valve seating position before the toggle lever is reset by means of the cable 89 and its operating knob or handle 91. The return of the latch 36 to its valve lever holding position also swings the mercury switch element mount 84 back into the normal position illustrated in Fig. 3 and again closes the circuit to the solenoid coil 63 at the control point within the casing. Naturally, this resetting of the valve control mechanism should not take place until after the circuit to the solenoid coil 63 is broken at its remote point of control.

It now will be seen that the opening of the directional valve may be accomplished either by a person in the vicinity of the valve and its control mechanism or by either manually or automatically closing the circuit to the solenoid 63 at some remote point. It is necessary, however, for a person to go to the directional valve and its control mechanism to close the valve and reset the control.

It is to be understood that the form of this invention herewith shown and described is to be taken as a preferred example of the same, and that various changes in the shape, size, and arrangement of parts may be resorted to without departing from the spirit of the invention or the scope of the sub-joined claims.

Having thus described the invention, I claim:

1. Operating mechanism of the type described, comprising a pair of spaced mounting plates, a unit to be operated positioned between and attached to said plates and having a rotatable operating stem projecting through one of said plates, a weighted lever operatively attached to and supported by said stem to swing between unit operating and non-operating positions in a path lying outwardly of and parallel to said last mentioned mounting plate, and a unit control device attached to said mounting plates and having means movable into and out of a position in the path of the lever for releasably holding the lever in its non-operating position.

2. Operating mechanism of the type described, comprising spaced parallel mounting members, a unit to be operated attached to and positioned between the mounting members and having an operating stem, a weighted lever operatively attached to said stem to swing between unit operating and non-operating positions, and control means attached to the outer ends of said mounting members and positioned outwardly thereof for releasably holding the weighted lever in its non-operating position.

3. Operating mechanism of the type described, comprising a pair of spaced parallel mounting plates, a unit to be operated having its casing attached to and positioned between the mounting plates and having an operating stem and pipe connections passing through said plates, a weighted lever operatively attached to said stem to swing between unit operating and non-operating positions in a plane paralleling and lying outwardly of one of said plates, control means attached to the outer ends of both of said mounting plates for releasably holding the weighted lever in its non-operating position, and a resilient stop carried by the inner end portion of one of the mounting plates for absorbing the shock delivered by the weighted lever when it reaches its operating position.

4. Operating mechanism of the type described, comprising a pair of spaced mounting plates, a unit to be operated positioned between and attached to said plates and having an operating stem projecting through one of said plates, a weighted lever operatively attached to said stem to swing between unit operating and non-operating positions in a path lying outwardly of said last mentioned mounting plate, a unit control device attached to said mounting plates and having means movable into and out of a position in the path of the lever for releasably holding the lever in its non-operating position, and means adjustably carried by the lever and providing the engagement with the holding means of the control device to compensate for tolerances allowed in the attachment of the unit and the control device to the mounting plates.

5. Operating mechanism of the type described, comprising a pair of spaced mounting plates, a unit to be operated positioned between and attached to said plates and having an operating stem projecting through one of said plates, a weighted lever operatively attached to said stem to swing between unit operating and non-operating positions in a path lying outwardly of said last mentioned mounting plate, a unit control device attached to said mounting plates and having means movable into and out of a position in the path of the lever for releasably holding the lever in its non-operating position, means adjustably carried by the lever and producing the engagement with the holding means of the control device to compensate for tolerances allowed in the attachment of the unit and the control device to the mounting plates, and a resilient stop carried by one of said mounting plates for absorbing the shock delivered by the weighted lever when it reaches its operating position.

6. Operating mechanism of the type described, comprising a stem to be rotated, a weighted lever operatively attached to said stem to swing between two positions, and control means for releasably holding the weighted lever in one of its positions, said control means comprising a latch movable into and out of a position in the path of the lever, a toggle lever attached to the latch, spring means for conditioning the toggle lever with its joint past dead center in one direction to retain the latch in its weighted lever holding position, and means for breaking the toggle lever to move its joint past dead center in the other direction to effect withdrawal of the latch from the path of the weighted lever.

7. Operating mechanism of the type described, comprising mounting means, a stem rotatably supported by the mounting means, a weighted lever operatively attached to said stem to swing between two positions, and control means including a casing attached to said mounting means for releasably holding the weighted lever in one of its positions, said control means comprising a latch movable from a position within the casing into a position where it partially projects from the casing into the path of the lever, a toggle lever within the casing and attached to the latch, spring means for conditioning the toggle lever to retain the latch in its weighted lever holding position, means within the casing for breaking the toggle lever at its joint to effect withdrawal of the latch from the path of the weighted lever, and means extending to the outside of the casing for resetting the toggle lever.

8. In valve operating mechanism of the type described, a casing, a latch movable inwardly and outwardly of the casing, a toggle lever pivoted at one end to the latch and at its other end to the casing, a spring attached at its ends to the arms of the toggle, means for limiting the breaking of the joint of the toggle lever in one direction to a position slightly past dead center and in which position the latch is outwardly of the casing, means for breaking the joint of the toggle lever in the other direction to move the latch inwardly of the casing, and means extending to the outside of the casing and applying force to said joint for resetting said toggle lever.

9. In valve operating mechanism of the type described, a casing, a latch movable inwardly and outwardly of the casing, a toggle lever pivoted at one end to the latch and at its other end to the casing, a spring attached at its ends to the arms of the toggle, means for limiting the breaking of the joint of the toggle lever in one direction to a position slightly past dead center and in which position the latch is outwardly of the casing, and a solenoid operable to directly apply a force to the toggle lever when energized for breaking the joint of the toggle lever in the other direction to move the latch inwardly of the casing.

10. In valve operating mechanism of the type described, a casing, a latch movable inwardly and outwardly of the casing, a toggle lever pivoted at one end to the latch and at its other end to the casing, a spring attached at its ends to the arms of the toggle, means for limiting the breaking of the joint of the toggle in one direction to a position slightly past dead center and in which position the latch is inwardly of the casing, a solenoid operable when energized for breaking the joint of the toggle lever in the other direction to move the latch inwardly of the casing, an auxiliary switch for the solenoid circuit, and means operatively connecting the said switch to the toggle lever to cause the said switch to close the solenoid circuit when the toggle is in its first mentioned position and to cause the said switch to open the solenoid circuit as the toggle lever joint is broken in the opposite direction.

11. In valve operating mechanism of the type described, a casing, a latch movable inwardly and outwardly of the casing, a toggle lever pivoted at one end to the latch and at its other end to the casing, a spring attached at its ends to the arms of the toggle, means for limiting the breaking of the joint of the toggle lever in one direction to a position slightly past dead center and in which position the latch is inwardly of the casing, a solenoid operable when energized for breaking the joint of the toggle lever in the other direction to move the latch inwardly of the casing, an auxiliary switch for the solenoid circuit, means operatively connecting the said switch to the latch to cause the switch to close the solenoid circuit when the toggle lever is in its first mentioned position and to cause the said switch to open the solenoid circuit as the toggle lever joint is broken in the opposite direction, and means connected to the toggle lever and projecting from the casing for resetting the said lever and its associated elements.

12. Valve control mechanism of the type described, comprising a casing, a latch movable inwardly and outwardly of the casing, a toggle lever pivoted on one end to the latch and at its other end to the casing, a spring attached at its ends to the arms of the toggle, means for limiting the breaking of the joint of the toggle in one direction to a position slightly past dead center, and means for breaking the joint of the toggle lever in the other direction to move the latch inwardly of the casing.

13. Valve control mechanism of the type described comprising a casing, a latch movable inwardly and outwardly of the casing, a toggle lever pivoted at one end to the latch and at its other end to the casing, a spring attached at its ends to the arms of the toggle, means acting directly on and for limiting the breaking of the joint of the toggle in one direction to a position slightly past dead center, and a solenoid operable when energized for applying force directly against the joint pin for moving the joint of the toggle lever in the other direction to move the latch inwardly of the casing.

14. Valve control mechanism of the type described comprising a casing, a latch movable inwardly and outwardly of the casing, a toggle lever pivoted at one end to the latch and at its other end to the casing, a spring attached at its ends to the arms of the toggle, means for limiting the breaking of the joint of the toggle in one direction to a position slightly past dead center and for manually breaking the joint of the toggle lever in the other direction to move the latch inwardly of the casing, a solenoid also operable when energized for breaking the joint of the toggle lever in said other direction to move the latch inwardly of the casing, an auxiliary mercury switch for the solenoid circuit, and a pivoted mounting member for said switch to operatively connect the switch to the latch to cause the switch to close the solenoid circuit when the toggle lever is in its first mentioned position and to cause the said switch to open the solenoid circuit as the toggle lever joint is broken in the opposite direction.

15. Valve control mechanism of the type described comprising a casing, a latch movable inwardly and outwardly of the casing, a toggle lever pivoted in the casing and connected at one end to the latch, spring means for actuating the toggle lever in either direction past dead center, means for limiting the movement of the joint of the toggle lever in one direction to a position slightly past dead center, and means for actuating said limiting means to cause the joint of the toggle lever to be broken in the other direction to move the latch inwardly of the casing.

EDWARD K. KUHLES.